United States Patent
Köhler et al.

(10) Patent No.: US 11,673,716 B2
(45) Date of Patent: Jun. 13, 2023

(54) BAG FOR THE DISTRIBUTION OF GOODS IN MAIL ORDER TRADE

(71) Applicant: Lidl Digital International GmbH & Co. KG, Neckarsulm (DE)

(72) Inventors: Stefan Köhler, Neckarsulm (DE); Falk-Johannes Schwarz, Neckarsulm (DE); Michael Hoffmann, Neckarsulm (DE)

(73) Assignee: Lidl Digital Internationial GmbH & Co. KG, Neckarsulm (DE)

( * ) Notice: Subject to any disclaimer, the term of this patent is extended or adjusted under 35 U.S.C. 154(b) by 104 days.

(21) Appl. No.: 16/804,202

(22) Filed: Feb. 28, 2020

(65) Prior Publication Data

US 2020/0317405 A1     Oct. 8, 2020

(51) Int. Cl.
    *B65D 33/24*      (2006.01)
    *B65D 33/00*      (2006.01)
    *B65D 33/04*      (2006.01)

(52) U.S. Cl.
    CPC ........... *B65D 33/24* (2013.01); *B65D 33/004* (2013.01); *B65D 33/04* (2013.01); *B65D 2203/02* (2013.01)

(58) Field of Classification Search
    CPC ....... B65D 33/24; B65D 33/004; B65D 33/04
(Continued)

(56) References Cited

U.S. PATENT DOCUMENTS 2,080,252 A * 5/1937 Cook ........................ H04N 3/20
                                                  383/90
4,679,242 A * 7/1987 Brockhaus ............... A45C 3/04
                                                  190/1
(Continued)

FOREIGN PATENT DOCUMENTS

CH          288909       2/1953
DE         29917542     12/1999
(Continued)

*Primary Examiner* — Derek J Battisti
(74) *Attorney, Agent, or Firm* — Head, Johnson, Kachigian & Wilkinson, PC

(57) ABSTRACT

The description pertains to a bag for shipping goods in the mail order business with a front side, a back side, a left side, a right side, a bottom side and a bag opening with an opening edge for the insertion and removal of the goods. This bag should be further developed in such a way that, on the one hand, it can accommodate a variety of different and differently sized goods in a manner that is safe for shipping and transport and on the other hand that it can be used as a reusable mailing bag in order to avoid unnecessary waste. To solve this problem, it is proposed to arrange back-side closure means at a back distance from the opening edge and to arrange first closure means on the front side at a first front-side distance from the opening edge and second front-side closure means at a second front-side distance from the opening edge, wherein the first front-side distance is smaller than the second front-side distance and the back-side distance is smaller than the first front-side distance, so that the bag opening becomes closable by turning over an upper region of the back side to the front side and connecting the back-side closure means to the first front-side closure means to provide a larger bag volume or to the second front closure means to provide a smaller bag volume.

15 Claims, 4 Drawing Sheets

Figure 1:
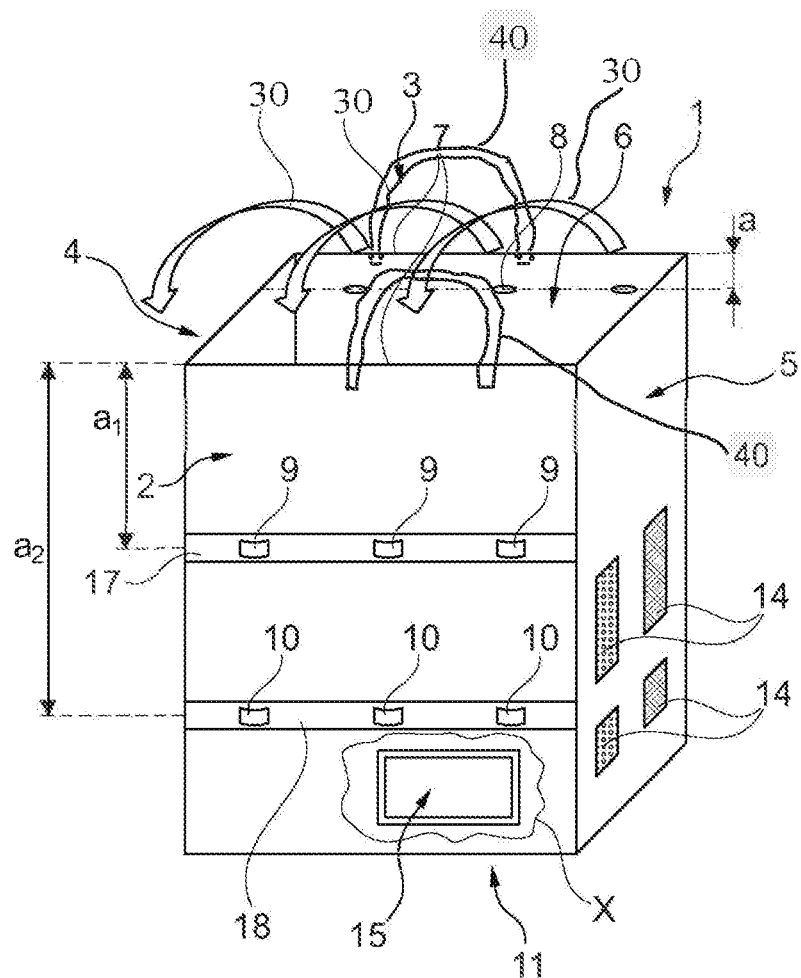

(58) Field of Classification Search
USPC .................................. 383/84, 2, 88, 85, 89
See application file for complete search history.

(56) References Cited

U.S. PATENT DOCUMENTS

| | | | |
|---|---|---|---|
| 4,706,297 | A | 11/1987 | Ausnit |
| 4,836,428 | A | 6/1989 | Evans et al. |
| 5,044,776 | A | 9/1991 | Schramer et al. |
| 6,257,472 | B1* | 7/2001 | Freedman .................. A45F 3/04 |
| | | | 150/108 |
| 8,132,601 | B2* | 3/2012 | Wang .................... B65D 31/12 |
| | | | 150/113 |
| 8,209,995 | B2* | 7/2012 | Kieling .................. A45C 3/001 |
| | | | 62/457.1 |
| 8,973,797 | B2* | 3/2015 | Langlois .................... B62J 9/00 |
| | | | 224/432 |
| 10,011,394 | B2* | 7/2018 | Greenwood ........... B65D 31/10 |
| 2004/0001653 | A1* | 1/2004 | Coval Carr ........... B65F 1/1615 |
| | | | 383/111 |
| 2009/0148076 | A1 | 6/2009 | Chang |
| 2010/0209019 | A1* | 8/2010 | Confoy .................. B65D 33/28 |
| | | | 383/4 |
| 2010/0270317 | A1 | 10/2010 | Kieling et al. |
| 2010/0316308 | A1 | 12/2010 | Heinlen et al. |
| 2011/0155794 | A1* | 6/2011 | Russell .................. B65D 29/00 |
| | | | 283/81 |
| 2012/0052161 | A1 | 3/2012 | Woodham |
| 2013/0026170 | A1 | 1/2013 | Zerfas et al. |
| 2015/0298829 | A1 | 10/2015 | Ouellette |
| 2016/0318662 | A1* | 11/2016 | De Leon .................. A45C 3/04 |
| 2017/0066559 | A1 | 3/2017 | Kim et al. |
| 2018/0252458 | A1* | 9/2018 | Furneaux .................. A45C 5/06 |

FOREIGN PATENT DOCUMENTS

| | | |
|---|---|---|
| DE | 202005021019 | 3/2007 |
| DE | 202011108606 | 3/2012 |
| DE | 202016104371 | 1/2017 |
| DE | 202018004378 | 11/2018 |
| EP | 0296482 | 6/1988 |
| WO | WO9615038 | 5/1996 |
| WO | WO96/29256 | 9/1996 |
| WO | WO2016024297 | 2/2016 |

* cited by examiner

BAG FOR THE DISTRIBUTION OF GOODS IN MAIL ORDER TRADE

FIELD OF APPLICATION

The invention relates to a bag for shipping goods in the mail order business. The bag is intended to avoid waste since it is a reusable mailing bag.

TECHNICAL BACKGROUND

It is common knowledge that the mail order business requires many types of packaging to ship the respective goods. Depending on the type and size of the goods, different types of packaging are used, which differ from one another in terms of their type and size to ensure adequate shipping and transport safety. Therefore, the mail order company must always keep a corresponding plurality of packaging types and sizes in stock.

Furthermore, the mail order business regularly uses disposable packaging. Most of the customers of a mail order company dispose of the packaging, at least when they choose to keep the delivered goods. Accordingly, there is a lot of waste and the raw materials needed to manufacture the packaging are not used in the best possible manner.

PRESENTATION OF THE INVENTION a) Technical Task

It is therefore the object of the present invention to provide a bag for the shipments of goods in the mail order business which, on the one hand, can accommodate a large number of different and differently sized goods in a shipping or transport-safe manner and, on the other hand, can be used as a reusable mailing bag, thus avoiding unnecessary waste.

b) Solution of the Task

This object is achieved by means of a bag with the features of claim 1. Further embodiments of the bag according to the invention are described in the subclaims.

According to the invention, a bag for shipping mail-ordered goods is proposed, which has a front side, a back side, a left side, a right side, a bottom side and an opening with a closed circumferential opening edge for inserting and removing the goods to be shipped. Closure means are arranged on the back side at a back-side distance from the opening edge. First front-side closure means with a first front-side distance to the opening edge and second front-side closure means with a second front-side distance to the opening edge are arranged on the front side.

The first front-side distance is smaller than the second front-side distance. Furthermore, the back-side distance is smaller than the first front-side distance. This makes it possible to close the opening surrounded by the opening edge by turning an upper region of the back side to the front side and by connecting the back-side closure means to the first front-side closure means to provide a larger bag volume or to the second front-side closure means to provide a smaller bag volume. The material of the bag according to the invention has the flexibility required for this.

The bag according to the invention is designed without a cover. This means that it does not have a cover element with cover-side closure means projecting from the peripheral opening edge, by means of which the bag opening could be closed by connecting the cover-side closure means to the first front-side closure means or to the second front-side closure means. Despite its lack of a cover, the bag according to the invention can be closed tightly and securely.

The advantage of the bag according to the invention is that at least two different sized bag volumes can be made available. The bag volume used for packaging the goods can thus be adapted to the geometric dimensions of the goods. As a result, the mail order business does not have to keep differently sized packaging on hand for goods of different sizes.

The back-side distance is preferably less than or equal to 30% of the first front-side distance. The first front-side distance is advantageously less than or equal to 60% of the second front side distance.

The back-side closure means interact either with the first front-side closure means or with the second front-side closure means. All of the aforementioned closure means are designed so robustly that they easily withstand the loads that usually occur during the transport of the bag filled with the goods that are shipped from the mail order company to the customer. In addition, all of the aforementioned closure means are designed in such a way that they cannot be opened without an additional tool, in particular when transported from the mail order company to the customer.

It is conceivable to provide a different design for the back-side closure means on the one hand and the first front-side closure means and the second front-side closure means on the other hand. In this case, the back-side closure means engage in the first front-side closure means or in the second front-side closure means or vice versa in a suitable manner.

It is particularly advantageous to design the back-side closure means on the one hand and the first front-side closure means and the second front side closure means on the other hand of similar type. In this case, the similar closure means can be connected to one another, if necessary, with the aid of a separate closure element. This separate closure element 5 preferably simultaneously secures the closure means connected to it against unauthorized opening by third parties without an additional tool.

The similar closure means can, for example, each be at least one robust and tear-proof loop attached to the bag. In that case, the back-side closure means is formed by at least one loop on the back side. Then, the first front-side closure means is formed by at least one first front-side loop and the second front-side closure means consists of at least one second front-side loop. The separate closure element can then be formed by a tying means and the at least one back-side loop can be connected to the at least one first front-side loop or to the at least one second front-side loop by using the tying means, preferably a zip tie. The bag opening can thus be closed securely so that it can resist the stresses that occur during the transport of the bag filled with goods. The number of loops per closure means is selected in a suitable manner depending on the absolute size of the bag. One, two, three or more loops per closure means are conceivable.

Advantageously, lateral compression means may be arranged on the left and on the right side of the bag for gathering the left and right sides. The larger bag volume or the smaller bag volume, which depends on the interacting closure means, can then be reduced by gathering the left side and the right side of the bag, which, at the same time, makes it possible to hold the goods in the bag in place. This advantageously prevents the goods from moving or falling around in the bag during their transport.

The front side of the bag spans across a front plane while the back side of the bag spans across a back plane. In a particularly advantageous manner, the lateral compression means are arranged at locations or in regions on the left or right side that are spaced apart from both the front plane of the bag and the back plane of the bag. In this way, a maximum gathering effect of the lateral compression means can be achieved.

All means that can be connected to one another as easily as possible and opened again are suitable as lateral compression means. A secure connection geared at avoiding an unauthorized opening by third parties is not important here. The lateral compression means are preferably formed by Velcro fasteners or snap fasteners or zip fasteners.

In a further advantageous manner, bottom side compression means for gathering the bottom side can be arranged on the bottom side of the bag. The compression means on the bottom side also make it possible to reduce the existing larger bag volume or smaller bag volume depending on the interacting closure means, and to thereby fix the goods in the bag in place so that any movement or falling of the goods in the bag is counteracted.

If necessary, the bottom side compression means can be arranged almost in the front plane that spans across the front side and almost in the back plane that spans across the back side. In this way, the front lower edge and the back lower edge of the bag can be almost brought together so that the depth of the bottom side of the bag—viewed in the direction perpendicular to the front or back plane that spans across the front side or the back side—can be reduced to almost zero.

The compression means on the bottom side are also preferably designed such that they can be connected and detached from one another as simply as possible. Velcro fasteners, snap fasteners or zip fasteners are suitable.

The bag according to the invention is advantageously provided with a shipping window unit which has a lateral opening for inserting a shipping label into the shipping window. The usual logistics, goods and recipient information is provided on the shipping label. A closure flap for closing the side opening ensures that the shipping label is prevented from falling out of the shipping window unit, particularly during the transport of the bag.

In a particularly advantageous manner, a carrying strap is arranged on the front and on the back side of the bag in such a way that the bag can be used by the recipient as a permanent carrying bag after the goods are delivered to the recipient. The respective carrying strap is preferably attached to the inner surface of the front side or the back side, so that it cannot interfere with the use of the bag according to the invention in the mail order business. In this case, the bag according to the invention can then be used for multiple purposes, at least once as a mailing bag for shipping the goods from the mail order company to the recipient and, if appropriate, several times as a carrying bag by the recipient. The bag according to the invention is advantageously designed as a reusable, returnable mailing bag. This means that it is made of sturdy, tear-resistant material and, moreover, that all the closure means, compression means and the shipping window unit are able to withstand the stresses of multiple use as a mailing bag for the shipping of goods in the mail order business.

The reusable cycle of the bag according to the invention can be designed in a particularly practical manner by a mail order company which also maintains branch stores in the (retail) trade. The customer orders goods online from the mail order company and receives them in the bag according to the invention. In addition to the price of the goods, the customer pays a deposit for the bag according to the invention as part of the online order. After having received and unpacked the goods, the customer can return the bag according to the invention to one of the mail order company's brick-and-mortar chain stores and get the deposit back. Returned bags are collected in the stores and finally returned to the warehouse of the mail order company. In this way, the bag according to the invention becomes a reusable mailing bag which connects the mail order business to the brick-and-mortar (retail) trade.

c) Exemplary Embodiment

Figure 2:
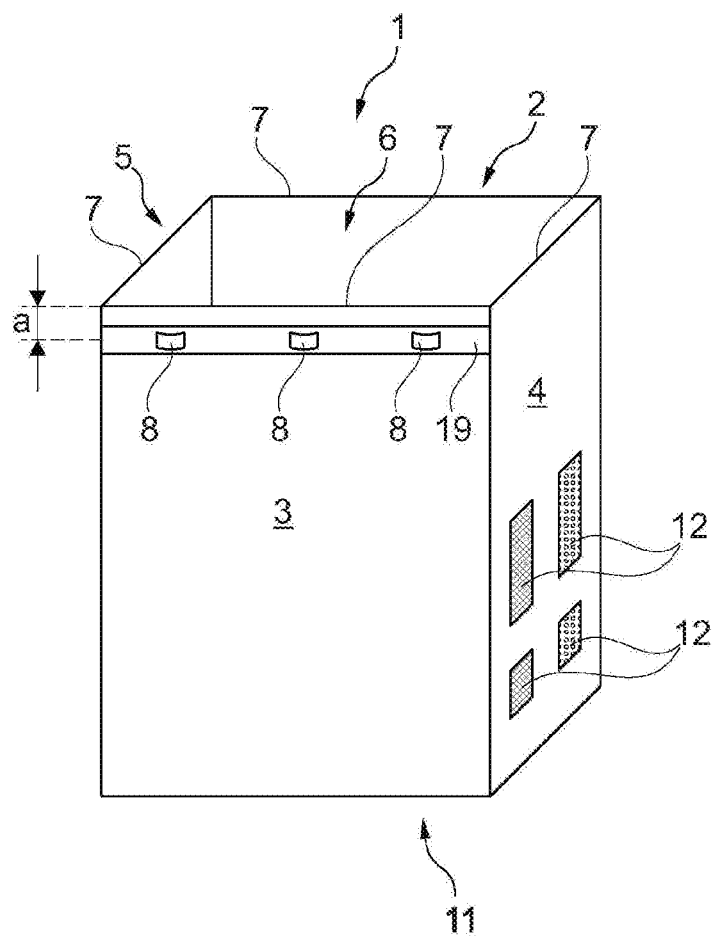
Figure 3:
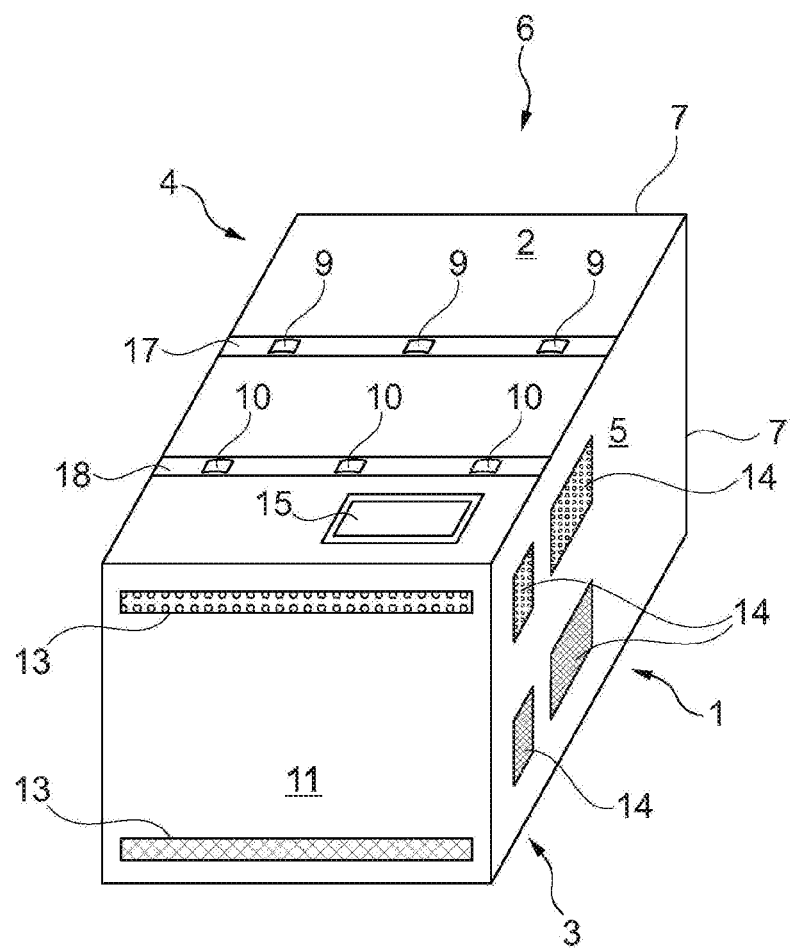
Figure 4:
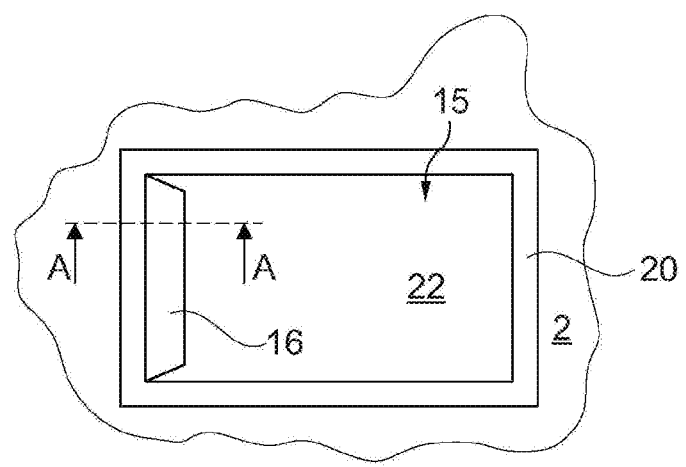

An exemplary embodiment of the bag according to the invention is described below by way of example with reference to the accompanying drawings. The figures show the following:

FIG. 1: a perspective view of the front side of an exemplary embodiment of the bag according to the invention;

FIG. 2: a perspective view of the back side of the bag shown in FIG. 1;

FIG. 3: a perspective view of the bottom side of the bag shown in FIG. 1;

FIG. 4: an enlarged view of the detail X from FIG. 1; and

Figure 5:
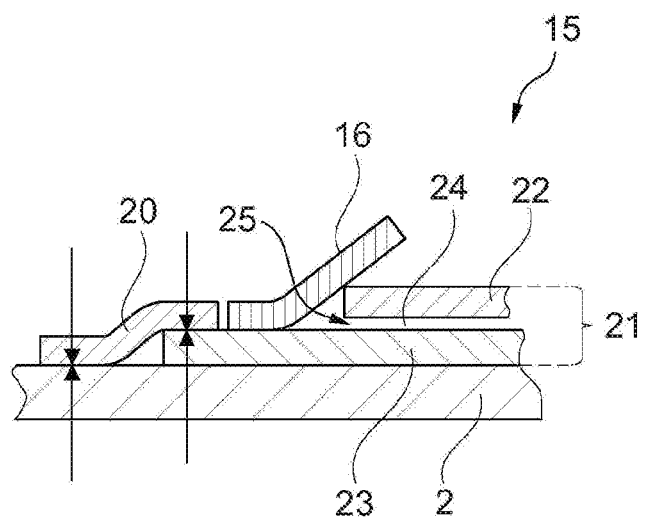

FIG. 5: an enlarged sectional view according to section A-A in FIG. 4.

The same reference numerals in FIGS. 1 to 5 designate the same parts or elements of the exemplary embodiment shown.

FIG. 1 schematically depicts a bag 1 according to the invention as an exemplary embodiment. It is made from a flexible material and can be deformed by hand in the manner of a flexible bag. The bag 1 has a front side 2, a back side 3 shown in FIG. 2, a left side 4 shown in FIG. 2, a right side 5 and a bottom side 11 shown in FIG. 3.

The upper edges of the front side 2, of the right side 5, of the back side 3 and of the left side 4 in FIG. 1 form a closed peripheral opening edge 7 which is in one plane in the exemplary embodiment shown. The opening edge 7 encloses a bag opening 6, through which goods can be placed into the bag 1, and goods can be removed from the bag 1. In the exemplary embodiment shown, the plane in which the opening edge 7 lies also runs parallel to the plane of the bottom side 11 of the bag 1.

On the outer surface of the front side 2, three loops 9 can be seen in FIG. 1 as the first front-side closure means and three loops 10 can be seen as the second front-side closure means. The loops 9 are fastened to the front side 2 by means of a first front fabric tape 17, the fabric tape 17 being sewn onto the front side 2 of the exemplary embodiment shown. The loops 10 are fastened to the front side 2 by means of a second front-side fabric tape 18, with the fabric tape 18 also being sewn onto the front side 2 of the exemplary embodiment shown. The three loops 9 can, just as the three loops 10, be formed, for example, by gathering the fabric tape 17 or 18 together. The loops 9 and 10 then consist of relatively short sections of the fabric tape 17 and 18 themselves.

FIG. 2 shows the back side 3 of the bag 1 according to the invention. In the upper region of the outer surface of the back side 3, three loops 8 are attached as back-side closure means. In the exemplary embodiment shown, the loops 8 are also sewn onto the back side 3 by means of a fabric tape 19. By gathering the fabric tape 19 together, the loops 8 can be formed by relatively short sections of the fabric tape 19 itself.

The distance $a_1$ drawn in FIG. 1, which is measured from the center of the first front side fabric tape 17 to the edge section of the opening edge 7 located on the front side 2, is smaller than the distance $a_2$, drawn in FIG. 1, which is measured from the center of the second front side fabric tape 18 to the edge section of the opening edge 7 located on the front side 2.

FIGS. 1 and 2 show the distance a, which is measured from the center of the back-side fabric tape 19 and thus from the loops 8 to the edge section of the opening edge 7 located on the back side 3. This distance a is smaller than the distance $a_1$.

The differently large distances $a_1$ and $a_2$ make it possible to close the bag opening 6 based on the size of the goods to be packaged. Regardless of whether the goods require a larger or a smaller bag volume, the bag 1 is first compressed in the upper regions of its left side 4 and its right side 5 as shown in FIGS. 1 and 2 in such a way that the front edge section of the opening edge 7 shown in FIG. 1 and the back edge section of the opening edge 7 shown in FIG. 1 essentially lie against one another. Then, the upper region of the back side 3 is turned over onto the front side 2 by using the three loops 8 according to the arrows P, so that the loops 8 can be aligned with the loops 9 or with the loops 10 and connected to one another. During the turnover movement according to the arrows P, the fabric tape 19 rotates about its longitudinal axis, which runs horizontally in FIG. 2, by approximately 180°.

If the goods to be packaged require a larger bag volume, the loops 8 are connected to the loops 9. If, on the other hand, a smaller bag volume is sufficient for the goods to be packaged, the loops 8 are connected to the loops 10. In the exemplary embodiment shown, the loops 8 are connected with the loops 9 or with the loops 10 by means of a total of three zip ties 30 shown in FIG. 1B. Each of the three loops 8 is connected to one of the loops 9 or to one of the loops 10 by means of one of the three zip ties. The respective zip tie is passed through both loop 8 and loop 9 or both loop 8 and loop 10. Since the customary zip ties cannot be opened without additional tools such as scissors or the like, the connection of the loops 8 with the loops 9 or the loops 10 by means of zip ties represents a sufficiently secure closure method for the transport of the goods to be shipped.

FIG. 1 shows Velcro strips 14 on the right side, which act as hook-and-loop fastening means or lateral compression means for gathering the right side 5 of the bag 1. As can be seen in FIG. 2, 4. Velcro strips 12 are attached to the Velcro strips 14 on the left side in a symmetrical arrangement and act as hook-and-loop fastening means or lateral compression means for gathering the left side 4 of the bag 1. To gather the left or right side 4 or 5, the Velcro strips 12 and 14 marked with an "o" and an "x" are connected to each other. As a result, the front side 2 and the back side 3 are moved towards one another in the direction of view in FIG. 1 or FIG. 2 in such a way that their distance from each other and thus the volume of the bag decreases. Instead of the Velcro strips 12, 14, other types of lateral compression means are also conceivable, such as snap fasteners or zippers.

As can best be seen in FIG. 1, the Velcro strips 12, 14 in FIG. 1 are positioned below the three loops 9, which act as the first front side closure means. No lateral compression means are required above the first front-side closure means, since this region is turned over to close the bag 1.

Furthermore, as can be seen in FIGS. 1 and 2, the Velcro strips 12, 14 are arranged on the left side 4 and the right side 5, respectively, in such a way that they are spaced apart from the plane of the front side 2 and from the plane of the back side 3. This arrangement means that the bag volume can only be reduced by the gathering the left or right side 4 or 5 up to a predetermined maximum reduction volume. A reduction in the bag volume to almost zero by gathering the left or right side 4 or 5 such that the inner surfaces of the front side 2 and the back side 3 come into contact with one another is not possible in the exemplary embodiment shown.

In FIG. 3, two Velcro strips 13 are shown on the bottom side 11 of the bag 1, which act as bottom side hook-and-loop fastening means or bottom side compression means. By connecting the two Velcro strips 13 with each other, the bottom side 11 can be gathered and thus the bag volume reduced. It is conceivable to arrange the upper Velcro strip 13 FIG. 3 directly adjacent to the upper edge of the bottom side 11 in FIG. 3 and to arrange the lower Velcro strip 13 in FIG. 3 directly adjacent the bottom edge 11 in FIG. 3. The bottom side 11 can then be gathered in such a way that the upper edge of the bottom side 11 in FIG. 3 almost coincides with the bottom edge of the bottom side 11 in FIG. 3.

The goods to be shipped in the bag 1 are packaged as follows:

First, the goods are inserted through the bag opening 6 and placed in the interior of the bag 1. Depending on how much air the goods leave between their upper end and the plane of the bag opening 6, a decision is made as to whether the back loops 8 are connected to the first front loops 9 or to the second front loops 10. Depending on that decision, the back loops 8 are finally connected to the first front loops 9 or to the second front loops 10 by turning them over according to the arrows P and threading the zip ties through them so that the bag opening 6 is closed and a larger or smaller bag volume is achieved.

Depending on their size and geometry, the goods may then still be able to move somewhat inside the bag 1. In order address this issue, the bag 1 can be compressed further with the Velcro strips 12, 14 and 11 so that the inner surfaces of the bag 1 lie against the goods and are thus held in place in the bag 1. Thus, it is possible to prevent the goods from moving or falling around in the bag 1 during their transport to the customer.

FIG. 4 shows the enlarged detail X from FIG. 1. A shipping window unit 15 can be seen, which is sewn onto the front side 2 of the bag 1 by means of a fabric tape 20.

FIG. 5 shows a sectional view according to the section A-A marked in FIG. 4. In the exemplary embodiment shown, the shipping window unit 15 has a weather-resistant sleeve 21 for receiving a shipping label, which is not shown. The sleeve 21 consists of a transparent shipping window 22 and a carrier layer 23 which is sewn onto the front side 2 of the bag 1 by means of the fabric tape 20.

The shipping label can be inserted through a slot-shaped opening 25 into a receiving space 24 of the sleeve 21 provided for the shipping label. For this purpose, a closure flap 16 fastened to the carrier layer 23 can be bent in a counterclockwise direction in FIG. 5. After the shipping label has been inserted into the receiving space 24, the closure flap 16 can be inserted through the opening 25 into the receiving space 24 such that it comes to lie between the transparent shipping window 22 and the shipping label itself. This prevents in a particularly advantageous manner that the shipping label may fall out of the shipping window unit 15 during the transport of the goods in the bag 1.

In the embodiment shown, the shipping window unit 15 is attached to the front side 2 of the bag 1. It is also conceivable of course to alternatively attach the shipping window unit 15 at another suitable location on the bag 1, for example in the lower region of the back side 3 shown in FIG. 2.

A carrying strap 40, two of which are seen in FIG. 1A, can be attached to the inner surface of the front side 2 and the inner surface of the back side 3. This carrying strap 40 initially has no function when the bag 1 is used for the mail order. If, after receiving the goods and unpacking them from the bag 1, the customer decides not to return the bag 1 for a return of the deposit, the customer can use the bag 1 several times as a carrying bag and use the carrying straps on the inner surfaces of the front side 2 and the back side 3 for this purpose.

The bag 1 according to the invention thus can be used as a reusable bag in two ways:

On the one hand, it can be used as a reusable mailing bag for mail orders. This is the case when the customer who received goods from the mail order company returns the bag 1 for a return of the deposit, which the customer can preferably do in a brick-and-mortar store of the (retail) trade, which may also be maintained by the mail order company. The returned bag 1 is finally returned to the mail order warehouse for reuse. In this case, the bag 1 goes through a reuse cycle as a returnable mailing bag.

On the other hand, it is possible to use the bag 1 only once as a mailing bag. After having received the goods from the mail order company, the customer decides to keep the bag 1 and to use it as a carrying bag for the customer's own purposes and to use the carrying straps 40. In this case, the bag 1 is used for two reusable purposes, namely for at least one use as a mailing bag and for a repeated use as a carrying bag.

REFERENCE SIGN LIST

1 Bag
2 Front side
3 Back side
4 Left side
4 Right side
6 Bag opening
7 Opening edge
8 Back-side closure means (loops)
9 First front-side closure means (loops)
10 Second front-side closure means (loops)
11 Bottom side
12 Lateral compression means (Velcro strips)
13 Bottom side
14 Lateral compression means (Velcro strips)
15 Shipping window unit
16 Closure flap
17 First front-side fabric tape
18 Second front-side fabric tape
19 Back-side fabric tape
20 Fabric tape
21 Shipping label sleeve
22 Clear shipping window
23 Carrier layer
24 Receiving space for the shipping label
25 Opening of the receiving space 24
P Arrows for the turnover movement

The invention claimed is:

1. A bag (1) for shipping goods in the mail order business with a front side (2), a back side (3), a left side (4), a right side (5), a bottom side (11) and a bag opening (6) comprising an opening edge (7) for inserting and removing the goods. comprising:

Back-side closure means (8) arranged on the back side (3) at a back-side distance (a) from the opening edge (7), first front-side closure means (9) arranged on the front side (2) with a first front-side distance ($a_1$) from the opening edge (7) and second front-side closure means (10) arranged with a second front-side distance ($a_2$) from the opening edge (7), and wherein the first front-side distance ($a_1$) is smaller than the second front-side distance ($a_2$) and the back-side distance (a) is smaller than the first front-side distance ($a_1$), so that the bag opening (6) becomes closable by turning over an upper region of the back side (3) to the front side (2) and connecting the back-side closure means (8) with the first front-side closure means (9) to provide a larger bag volume or with the second front-side closure means (10) to provide a smaller bag volume, characterized in that the back-side closure means have a plurality of back-side loops (8), the first front-side closure means have a plurality of first front-side loops (9) and the second front-side closure means have a plurality of second front-side loops (10), wherein the plurality of back-side loops (8) can be connected with the aid of a plurality of zip ties to the plurality of first front-side loops (9) or to the plurality of second front-side loops (10) by passing each of the plurality of zip ties through both the back-side loop (8) and the first front-side loop (9) or through both the back-side loop (8) and the second front-side loop (10) respectively thereby providing a connection secured against unauthorized opening by third parties without an additional tool;

the back-side loops (8) are fastened to the back side (3) by a back-side fabric tape (19) and are formed by gathering the back-side fabric tape (19) together;

the first front-side loops (9) are fastened to the front side (2) by a first front-side fabric tape (17) and are formed by gathering the first front-side fabric tape (17) together; and the second front-side loops (10) are fastened to the front side (2) by a second front-side fabric tape (18) and are formed by gathering the second front-side fabric tape (18) together.

2. The bag according to claim 1,
characterized in that
the back-side distance (a) is less than or equal to 30% of the first front-side distance ($a_1$).

3. The bag according to claim 1,
characterized in that
the first front-side distance ($a_1$) is less than or equal to 60% of the second front-side distance ($a_2$).

4. The bag according to claim 1,
characterized in that
on the left side (4) and on the right side (5) lateral compression means (12, 14) are arranged for gathering the left side (4) and the right side (5) so that the larger bag volume or the smaller bag volume can be reduced, thereby holding the goods in the bag in place.

5. The bag according to claim 4,
characterized in that
the lateral compression means are formed by Velcro fasteners (12, 14), which are spaced apart from a front plane spanning across the front side (2) and from a back plane spanning across the back side (3).

6. The bag according to claim 4,
characterized in that
the lateral compression means are formed by snap fastener means, which are spaced apart from a front plane spanning across the front side (2) and from a back plane spanning across the back side (3).

7. The bag according to claim 4, characterized in that
the lateral compression means are formed by zipper fasteners, which are spaced apart from a front plane spanning across the front side (2) and from a back plane spanning across the back side (3).

8. The bag according to claim 1, characterized in that
bottom-side compression means (13) are arranged on the bottom side (11) for gathering the bottom side (11) so that the larger bag volume or the smaller bag volume can be reduced and the goods in the bag held in place.

9. The bag according to claim 8, characterized in that
the bottom-side compression means are formed by Velcro fasteners (13).

10. The bag according to claim 8, characterized in that
the bottom-side compression means are formed by snap fasteners.

11. The bag according to claim 8, characterized in that
the bottom-side compression means are formed by zipper means.

12. The bag according to claim 1, characterized in that
the bag has a shipping window unit (15) with an opening (25) for inserting a shipping label into the shipping window unit (15), a closure flap (16) for closing the opening (25), so that the shipping label does not fall out of the shipping window unit (15).

13. The bag according to claim 1, characterized in that
a carrying strap is arranged on the front side (2) and on the back side (3) such that the bag can be used by a recipient as a carrying bag after the goods have been delivered to the recipient.

14. The bag according to claim 1, characterized in that
the bag is designed as a reusable, returnable mailing bag.

15. The bag according to claim 4, characterized in that
bottom-side compression means (13) are arranged on the bottom side (11) for gathering the bottom side (11), so that the larger bag volume or the smaller bag volume can be reduced, which makes it possible to hold the goods in the bag in place.

* * * * *